June 18, 1963  J. J. ZIMMERMAN  3,094,093
AUTOMATIC SOLDERING MACHINE

Filed Sept. 23, 1958  8 Sheets-Sheet 1

INVENTOR:
Jack J. Zimmerman
By Smyth & Roston
Attorneys

June 18, 1963
J. J. ZIMMERMAN
3,094,093
AUTOMATIC SOLDERING MACHINE
Filed Sept. 23, 1958
8 Sheets-Sheet 2
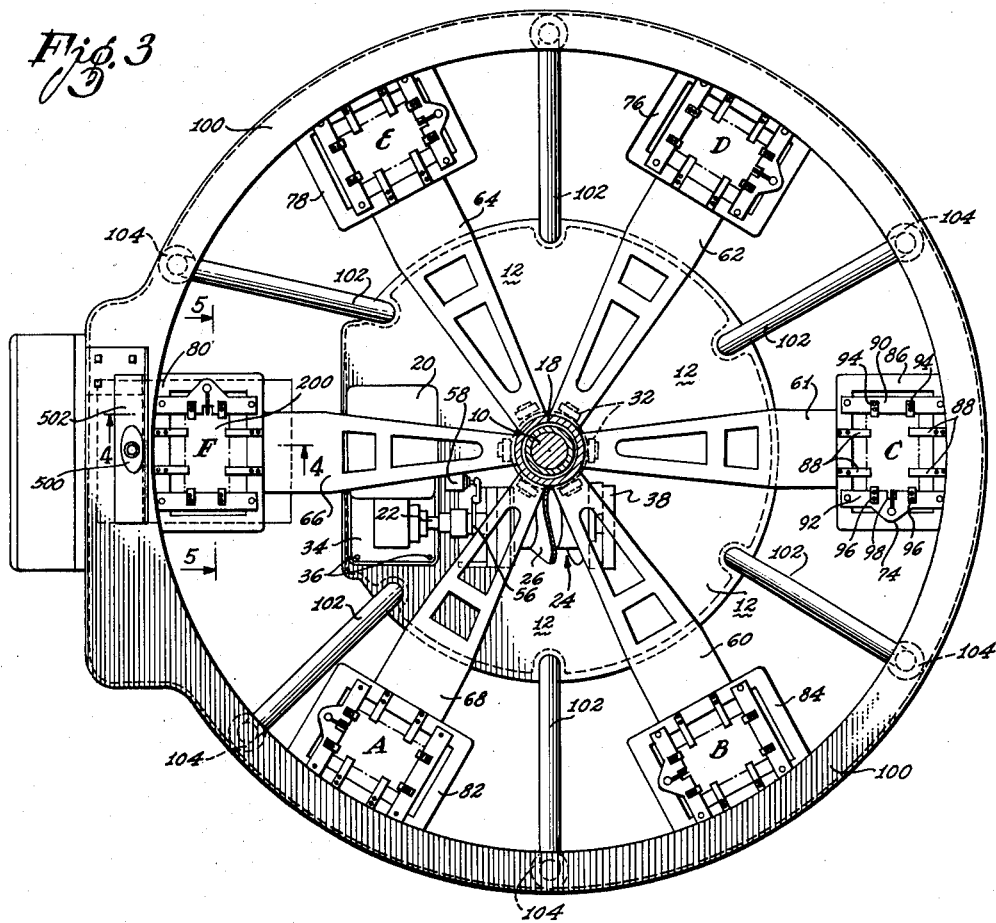
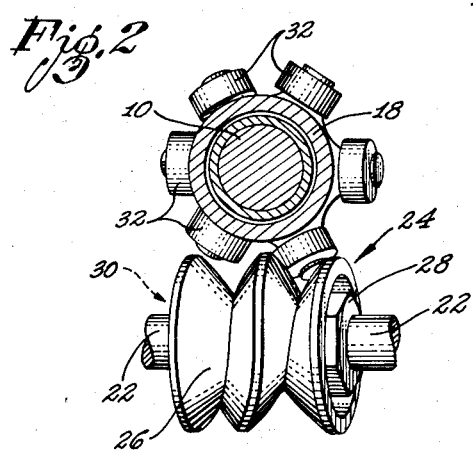
INVENTOR:
Jack J. Zimmerman
By Smyth & Roston
Attorneys June 18, 1963  J. J. ZIMMERMAN  3,094,093
AUTOMATIC SOLDERING MACHINE
Filed Sept. 23, 1958  8 Sheets-Sheet 3

INVENTOR:
Jack J. Zimmerman
By Smyth & Roston
Attorneys

INVENTOR:
Jack J. Zimmerman
By Smyth & Roston
Attorneys

June 18, 1963

J. J. ZIMMERMAN 3,094,093

AUTOMATIC SOLDERING MACHINE

Filed Sept. 23, 1958

INVENTOR:
Jack J. Zimmerman
By Smyth & Roston
Attorneys

June 18, 1963

J. J. ZIMMERMAN 3,094,093

AUTOMATIC SOLDERING MACHINE

Filed Sept. 23, 1958

INVENTOR:
Jack J. Zimmerman
By Smyth & Roston
Attorneys

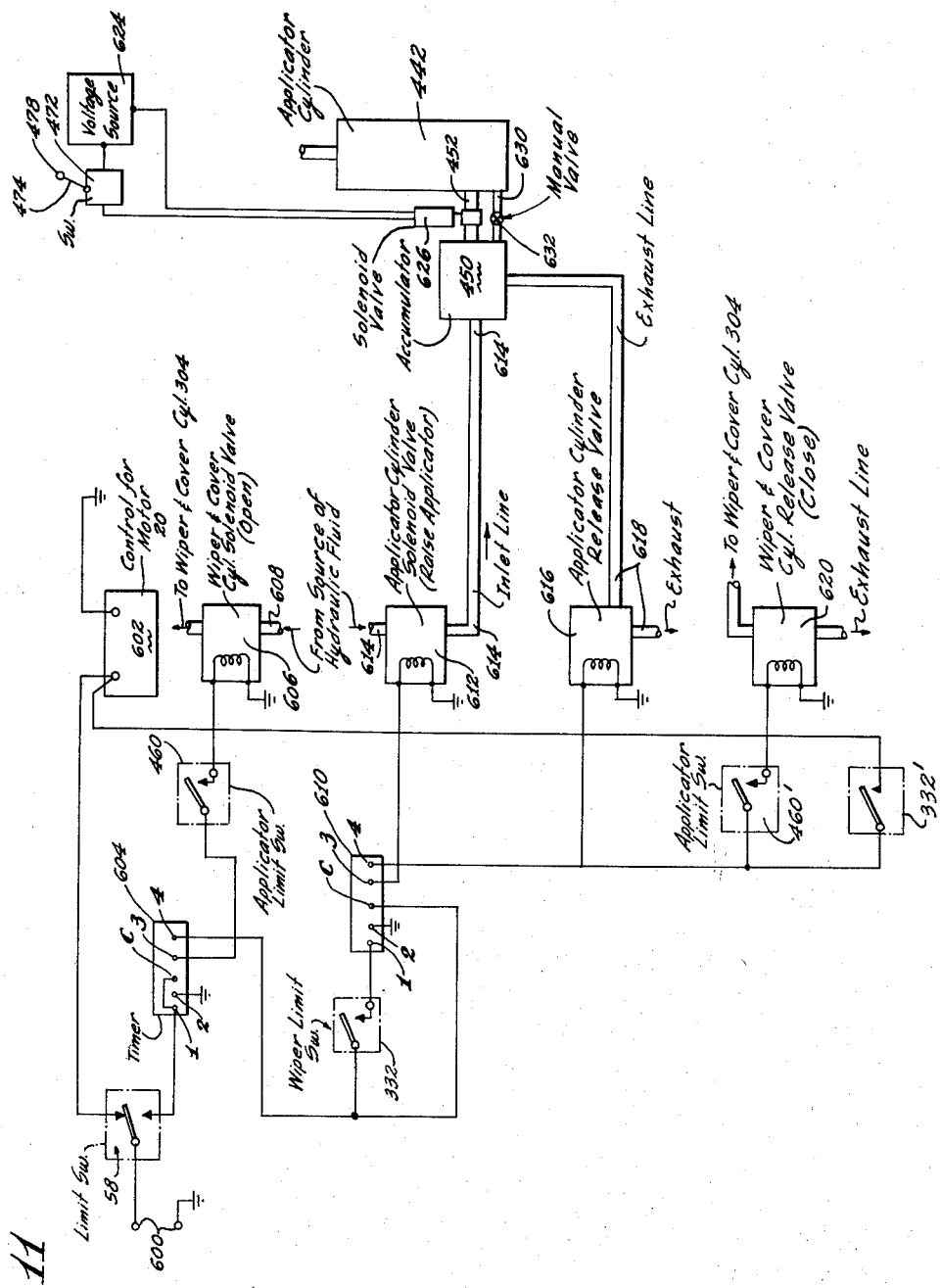

United States Patent Office 3,094,093
Patented June 18, 1963

3,094,093
AUTOMATIC SOLDERING MACHINE
Jack J. Zimmerman, 143 S. Delaplaine Road,
Riverside, Ill.
Filed Sept. 23, 1958, Ser. No. 762,871
10 Claims. (Cl. 113—126)

The present invention relates to automatic soldering machines for processing printed circuit panel assemblies and to provide the required soldered joints for components supported on such assemblies.

Copending application Ser. No. 625,907, filed December 3, 1956, in the name of the present inventor discloses and claims an improved printed circuit panel assembly in which electrical conductors are formed in one or more surfaces of an insulating panel. These conductors conform to a selected design and configuration which, in turn, corresponds to the electrical circuit of the electronic equipment of which the panel assembly is to form a part.

As fully described in the copending application, the printed circuit board or panel is provided with a plurality of flared metalized holes. These holes are adapted to receive the pig-tail or other terminal connections of the various electrical and electronic components which are supported on the panel and which are to be included in the electrical circuit imprinted on the surfaces of the panel. As also described in that application, the terminal connectors of these components are soldered in flared metalized apertures by the formation of solder nuggets in the apertures, these nuggets being firmly retained and locked in the apertures due to their flared configuration.

The automatic soldering machine of the present invention is particularly suited for use in conjunction with printed circuit boards or panel assemblies of the type described in the copending application referred to above. However, it will be apparent as the description proceeds that the machine of the present invention finds general utility wherever it is desired quickly and efficiently to solder electrical or other components to a supporting surface.

The machine of the present invention includes a movable conveyor for the printed circuit boards. This conveyor, in one embodiment, takes the form of a plurality of pallets which are supported on radial arms extending outwardly from a central, vertical rotatable shaft. The pallets are each adapted to removably support a printed circuit board, and the various components to be supported by the board may be inserted either manually or automatically when the board is on a pallet. These components are supported on the board, as described above, with their pig-tail connectors extending down into metalized apertures in the board to be soldered to the circuit conductors formed on the surfaces of the board and extending into electrical contact with respective ones of the metalized apertures.

A drive mechanism intermittently rotates the central vertical shaft of the machine to bring the pallets and the supported printed circuit boards and their associated components successively over a solder station. Each board is positioned for an interval over the solder station, and a solder applicator moves upwardly at this station under the positioned board to bring molten solder up to the underside of the board. This molten solder immediately flows into the metalised apertures in the board to provide positive and secure solder connections for the terminal connectors of the components on the positioned board.

The present invention is particularly concerned with an improved mechanism at the solder station for efficiently bringing molten solder to the underside of each positioned board to effect the desired solder connections.

Many problems have arisen in the past in the attempts that have been made to provide a truly efficient automatic soldering mechanism at the solder station. Usual dip soldering techniques are impractical because they entail complex movements of the boards. That is, for dip soldering the printed circuit boards, in addition to being moved into position at the solder station, must then be moved downwardly into a solder pot. Also, dip soldering techniques of the type practiced in the prior art have proved to be wasteful of solder and to have a tendency of exposing the boards to a deteriorating baking heat.

Selective soldering machines have been devised in the past. These machines usually include a plurality of independent vertically extending cups, or other selective type of solder carrier, and these prior art machines also usually include some means for developing solder meniscuses at the tops of such cups or carriers. These meniscuses were developed to enable the solder carried by the carrier to come into soldering contact with the underside of the positioned board, so that the carrier itself in its uppermost position could remain spaced from and out of the way of the board. Such machines were believed to be advantageous in that they provided for simple selective soldering without the need to move the boards vertically at the solder station. Machines of this general type have been operated satisfactorily but they have created problems of their own. For example, the formation of solder meniscuses precludes a precise control of the solder level so as to prevent molten solder from passing through the apertures of the positioned board and flooding over its top surface.

The machine of the present invention uses a solder aplicator at the soldering station which moves upwardly out of a solder container into soldering contact with the lower side of a printed circuit board positioned over the container. However, the level of the solder in the applicator itself is controlled in an improved, exact and precise manner; and there is no need to form or rely on a solder meniscus to provide the soldering contact. In fact, provisions are made to prevent the formation of such meniscuses so as to obviate any danger of solder flooding over the top surface of the positioned board.

The machine of the invention uses a solder displacer that functions to displace solder upwardly in the applicator after the applicator has been raised to its soldering position under a positioned printed circuit board. The displacer brings the solder in the applicator up to the top of the applicator and into soldering contact with the underside of the positioned board, and it is designed and constructed so that it brings the solder in the applicator up to a certain precisely determined level with despect to the positioned board and no higher. This level is such that the solder will not run up over the top of the positioned board.

The applicator itself is preferably made out of steel, and it is tinned to allow the solder freely to overflow out of it. This precludes any tendency for the molten solder to form a meniscus or to form unwanted globules around the edge of the printed circuit board. The applicator in the embodiment of the invention which will be described, is moved upwardly to its soldering position by a simple hydraulic elevator system. The introduction of fluid into the system to raise the applicator is controlled and such introduction is restricted as the applicator approaches its upper position. The restriction in the introduction of the hydraulic fluid slows down the rate at which the applicator approaches its upper position. This slowing down of the applicator produces a relatively slow heating effect on the bottom of the positioned board which prevents warping or baking of the board. Also, and more importantly, the slowing down of the applicator as it approaches its upper position prevents solder from splashing from its top surface when the applicator is brought to a halt.

In like manner, the hydraulic fluid is released from the elevator to cause the applicator to return to its lower position, and such release of the fluid is restricted as the applicator first starts on its downward travel. This produces a slow removal of the applicator from the underside of the positioned board, and it prevents the formation of "stalactites" of solder on the underside of the board. At the same time, the relative speeding up of the elevator at the lower part of the travel of the applicator speeds up the soldering cycle to a material extent.

The solder displacer of the invention includes a plunger which moves down in a reservoir of solder when the applicator is in its raised soldering position. This reservoir is in fluid connection with the applicator and it moves upwardly with the applicator. The resulting displacement of solder in the reservoir by the plunger causes the molten solder in the applicator to be displaced upwardly. The walls of the reservoir have a selected height to cause the displaced solder to overflow at a certain level. This overflow of the displaced solder in the reservoir limits the rise of solder in the applicator, and the system is designed so that there is no possibility for the solder in the applicator to flood up over the top of the positioned printed circuit board.

The solder displacing plunger of the solder displacer is positioned at the end of a piston which, in turn, is slidably mounted in a cylinder. The cylinder is moved upwardly by the reservoir and because of its inability to displace the air in the cylinder quickly enough, the piston moves upwardly with the cylinder. However, an intake valve in the head of the cylinder allows the piston to move down slowly in the cylinder after the cylinder has been moved to its upper position, with air being slowly drawn into the cylinder through this valve. While this is taking place, the piston moves slowly down the cylinder, and the solder displacing plunger moves down in the reservoir to displace the solder in the reservoir, as noted above.

An exhaust valve is also incorporated in the cylinder head which allows the air drawn into the cylinder through the intake valve to be rapidly discharged or exhausted upon the return stroke of the piston. This return stroke occurs when the cylinder is returned to its lower position upon the retraction of the reservoir. This allows the cylinder to return rapidly to its lower position and materially speeds up the operational cycle of the machine. A stationary bracket holds the piston while the cylinder is undergoing such downward motion, and this bracket also serves to limit the downward travel of the piston.

A convenient metallic cover is provided in one embodiment of the invention which serves to close the top of the solder container as the printed circuit boards are being moved by the conveyor from one position to the next or when the machine is at rest. This cover comprises a series of metallic strips which extend across the container and which are supported at their ends on a pair of movable chains extending along the sides of the container. These chains are controllable to move the strips from a closed position across the top of the container to an open position down one side of the container.

The present invention provides, therefore, an improved and commercially practical automatic soldering machine in which the problems encountered in prior art machines of this general type are successfully solved. The machine of the invention is relatively economical in its construction, and it is efficient and troublefree in its operation.

In the drawings which are to be considered as merely illustrative of one embodiment of the invention:

FIGURE 2 is a fragmentary sectional view showing the particular intermittent Ferguson drive mechanism used in the machine of FIGURE 1;

FIGURE 3 is a top plan view of the invention to show particularly the details of the radial arms and pallets of the conveyor for the printed circuit boards, and this view also shows further details of the drive mechanism for the conveyor and the solder station with which the present invention is particularly concerned;

FIGURE 5A is a view of the chain drive of FIGURE 5, substantially on the line 5a of FIGURE 5;

FIGURE 11 is a schematic diagram of the hydraulic, mechanical and electrical control systems of the illustrated embodiment of the invention.

Figure 1:
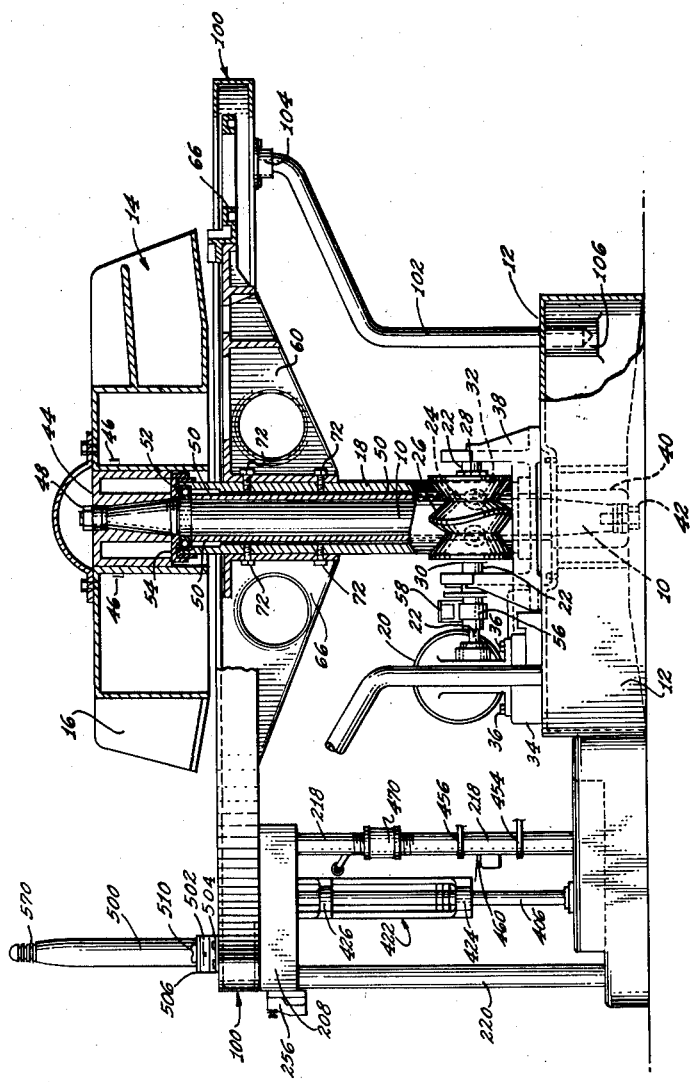
FIGURE 1 is a side elevational view of one embodiment of the invention partially in section and showing the central rotatable vertical shaft of the conveyor for the printed circuit boards and the intermittent drive for that shaft, this view also showing the radial arms and pallets supported by the central shaft and the solder station over which these pallets are successively positioned.

The machine of the invention includes a stationary vertical spindle 10 which is mounted on a base 12 and which extends upwardly from the base (FIGURE 1). The spindle 10 may conveniently support a series of bins or containers 14 for components at its upper end, and a counter-weight 16 is also supported in diametrically opposite relation to the containers of the top of the stationary spindle. These containers enable the components for the printed circuit boards to be conveniently disposed at angular intervals around the machine so that they may be manually placed in the boards transported by the machine for automatic soldering.

A rotatable tubular shaft 18 is also supported by the base 12. This rotatable shaft extends upwardly from the base in coaxial relationship with the stationary spindle 10, and the hollow shaft encloses the stationary spindle.

A drive motor 20 is mounted on the base 12, and the motor has a usual speed reducer and solenoid brake associated with it. A horizontal drive shaft 22 extends from the speed reducer, and this shaft is coupled to the rotatable shaft 18 through a Ferguson three-dimensional cam drive assembly 24.

The Ferguson drive is shown in FIGURE 2. It comprises a cam 26 of a somewhat complex configuration. The cam 26 is rigidly mounted on the drive shaft 22 by a pair of nuts 28 and 30 which are threaded to the drive shaft, and the cam is rotated by the drive shaft. The Ferguson drive 24 also includes a series of cam followers 32 which engage the cam 26. These cam followers are in the form of rotatable disks, and they are mounted on the periphery of the rotatable shaft 18 at equidistantly spaced angular positions around the shaft 18. The cam followers are made up of ball bearing races which are secured to radially extending studs on the shaft 18.

The motor 20 is supported on a platform 34 on the base 12 (FIGURE 1) and the motor is secured to this platform by a series of bolts 36. The drive shaft 22 of the motor extends through a U-shaped bracket 38, which bracket is mounted on the base 12. The shaft 22 is supported in suitable bearings on the spaced parallel upwardly extending legs of the bracket 38, and the cam 26 is supported by the shaft between those legs.

The base 12 has a tapered casting 40 secured to it, and this casting receives the lower end of the spindle 10 which is also tapered. A threaded bolt 42 extends through the casing 40 and into the lower end of the spindle 10, and this bolt serves rigidly to hold the spindle in the casing 40 and on the base 12 in its vertical upwardly extending position.

The containers 14 and the counterweight 16 are supported on a similar tapered casting 44 by a series of screws such as the screws 46 in FIGURE 1. The casting 44 extends over the tapered upper end of the central vertical spindle 10, and it is held rigidly on the spindle by means of a bolt 48 which is threaded into the end of the spindle.

A tubular sleeve 50 is mounted coaxially with the spindle 10, and this sleeve is interposed between the spindle and the rotatable shaft 18. This sleeve 50 serves as a spacer between the stationary vertical spindle 10 and the rotatable shaft 18. A ball bearing assembly 52 is supported at the top of the spindle 10 and a similar ball bearing assembly is supported at the bottom of the spindle. The ball bearing assemblies are so supported and retained against axial movement by retainers, such as the retainer 54, which are threaded to the opposite ends of the spindle 10 and which retain the inner races of the bearings against the ends of the sleeve 50. The rotatable shaft 18 is counterbored at its ends to receive the bearings, and the outer races of the bearings bear against shoulders at the ends of the rotatable shaft 18 to provide the necessary thrust.

The Ferguson drive assembly 24 is known to the art, and it is so constructed and designed that a 270 degree rotation of the drive shaft 22 produces a 60 degree rotation of the rotatable vertical shaft 18. The remaining 90 degree rotation of the drive shaft 22 is within the dwell interval of the cam 24, so that the rotatable shaft 18 remains at rest for this remaining rotation. Therefore, each full 360 degree rotation of the shaft 22 is effective to rotate the shaft 18 through 60 degrees to a rest position.

A switch actuator 56 is mounted on the motor drive shaft 22, and this switch actuator trips a switch 58 for each full revolution of the drive shaft 22 and at the beginning of the dwell interval of the cam 26. This tripping of the switch 58 de-energizes the motor 20, and it also actuates its solenoid brake to stop the motor. Because this de-energizing of the motor takes place during the dwell interval of the drive assembly, the actual angular position of the rotatable shaft 18 when the motor is de-energized is determined by the tolerances of the drive assembly itself and not by the time of de-energizing of the motor. This enables an extremely precise positioning of the shaft 18 for each of its arrested angular positions to be attained, because of the precision with which Ferguson drive assemblies can be constructed to operate.

In the manner described, the vertical shaft 18 is stopped at the end of each 60 degree angular movement of that shaft, and its position for each of such stops is precisely determined by the drive assembly 24. The drive assembly 24 is constructed so that the width and angle of the surface of the cam 26 pre-loads two of the cam followers 32 at its dwell position. This causes the rotatable shaft 18 to be rigidly retained in its set angular position each time this shaft is arrested.

A series of six pallet arms 60, 61, 62, 64, 66, and 68 (FIGURE 3) are secured to the upper end of the rotatable shaft 18 by a series of screws such as the screws 72 (FIGURE 1). These screws extend through inner end portions of these arms which embrace the vertical shaft 18, and the screws are threaded into the shaft. The arms 60, 61, 62, 64, 66 and 68 (as shown in FIGURE 3) extend radially outwardly from the rotatable shaft 18 at equidistantly spaced angular positions around the shaft.

A plurality of pallets 74, 76, 78, 80, 82 and 84 are mounted to the ends of respective ones of arms 60, 61, 62, 64, 66 and 68. The pallets are secured to the ends of the respective arms by bolts or any other suitable means. The pallets may each be in the form of an open framework, and their function is to support the printed circuit boards in a horizontal plane with the underside of such boards exposed.

The pallet 74, for example, includes a rectangular-shaped framework 86. A printed circuit board may be supported over the open center of the framework by a plurality of resilient latches 88. These latches engage the sides of the board, and they are in snap engagement with the board. The pallet also includes a pair of strips 90 and 92 which are secured to the framework 86 and which extend across the ends of that framework. The strip 90 includes a pair of lugs 94 which engage notches in one end of the supported printed circuit board, and the strip 92 includes a pair of lugs which engage the other end of the supported board. These lugs serve to align the supported board, and to hold it in precise alignment in the pallet.

The strip 92 is also provided with a pivoted lever 98. This lever has an end protruding under the supported board, and the lever serves as a convenient manually operated means for releasing the supported board from the pallet. Therefore, at a loading station the printed circuit boards may be snapped into the latches 88 on the pallet 74, and at an unloading station the particular board may be released by manully depressing the free end of the lever 98. The other pallets of the assembly may be similarly constructed.

In the illustrated mechanism of FIGURE 3, the pallet 80 is shown as positioned at the solder station of the system. The mechanism included at the solder station will be described in detail subsequently.

As noted above, and as shown in FIGURE 3, the conveyor portion of the mechanism includes the six radial pallet arms 60, 61, 62, 64, 66 and 68 with corresponding pallets 74, 76, 78, 80, 82 and 84 mounted at their respective ends. The pallets are surrounded by a circular guide rail 100, and they extend under this guide rail. The guide rail 100 is supported on the base 10 by a series of supporting legs 102. These legs have the configuration shown in FIGURES 1 and 3. Each leg is secured to the underside of the guide rail 100 by a suitable bracket, such as the bracket 104; and each leg extends into a casting in the base 12, such as the casting 106 (FIGURE 1).

The pallets 74, 76, 78, 80, 82 and 84 are successively brought over the solder station by the intermittent drive of the motor 22 and the Ferguson assembly 24 described above. The pallets, moreover, are precisely positioned by the drive assembly over the solder station because the motor 20 is de-energized each time the drive assembly 24 enters its dwell interval.

The conveyor portion of the mechanism is assumed to be rotating in a clockwise direction in FIGURE 3, and six separate stations designated A, B, C, D, E and F are here indicated. At station A, for example, a completed and soldered printed circuit panel assembly is removed from the pallet 82, and a new printed circuit board is snapped in place on the pallet. Then, and at the various stations, components from the different ones of the bins 14 (FIGURE 1) are removed and placed on the board as it is intermittently circulated from one station to the next. At the solder station F, the connections of the components so placed on the board are automatically soldered to the printed circuit on the board in a manner to be described.

Figure 4:
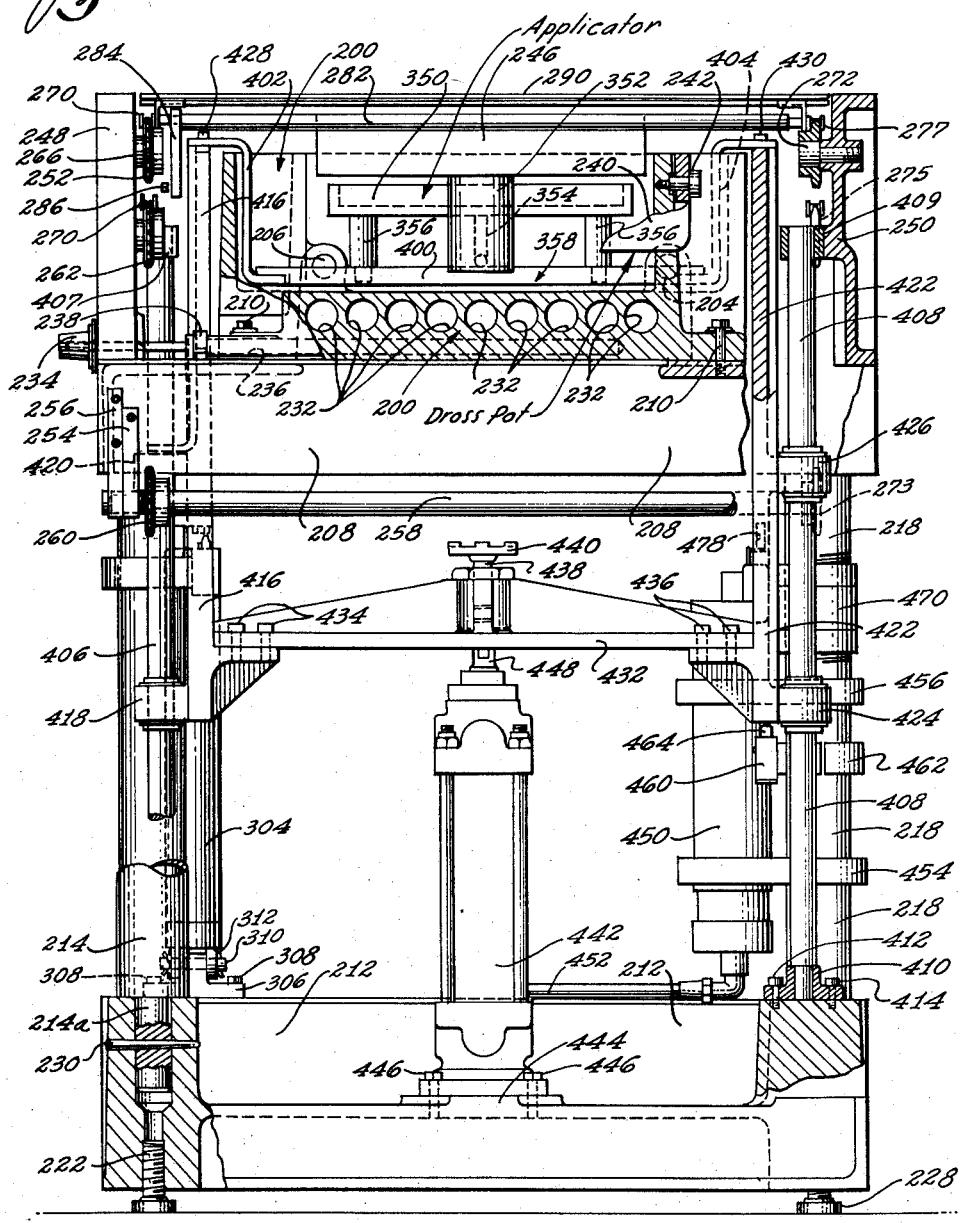
FIGURE 4 is a sectional view, substantially on the line 4—4 of FIGURE 3, and this view illustrates the solder station which incorporates an embodiment of the present invention including a solder applicator and an elevator mechanism for the applicator.
Figure 5:
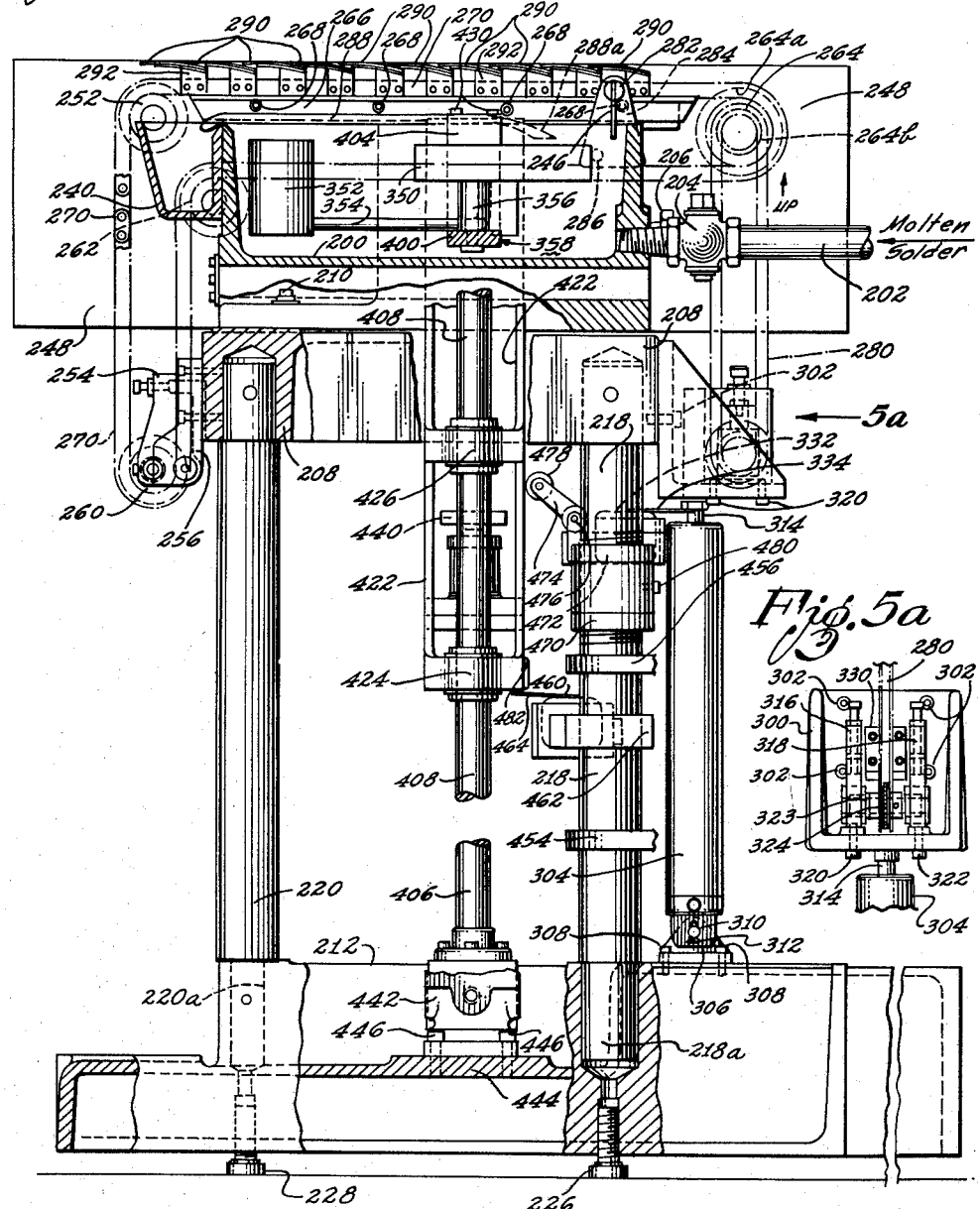
FIGURE 5 is a sectional view, substantially on the line 5—5 of FIGURE 3, and this view also shows details of the solder applicator and its lifting mechanism, this latter view also showing a chain drive mechanism and a movable cover for the solder station that is controlled by this chain drive.
Figure 6:
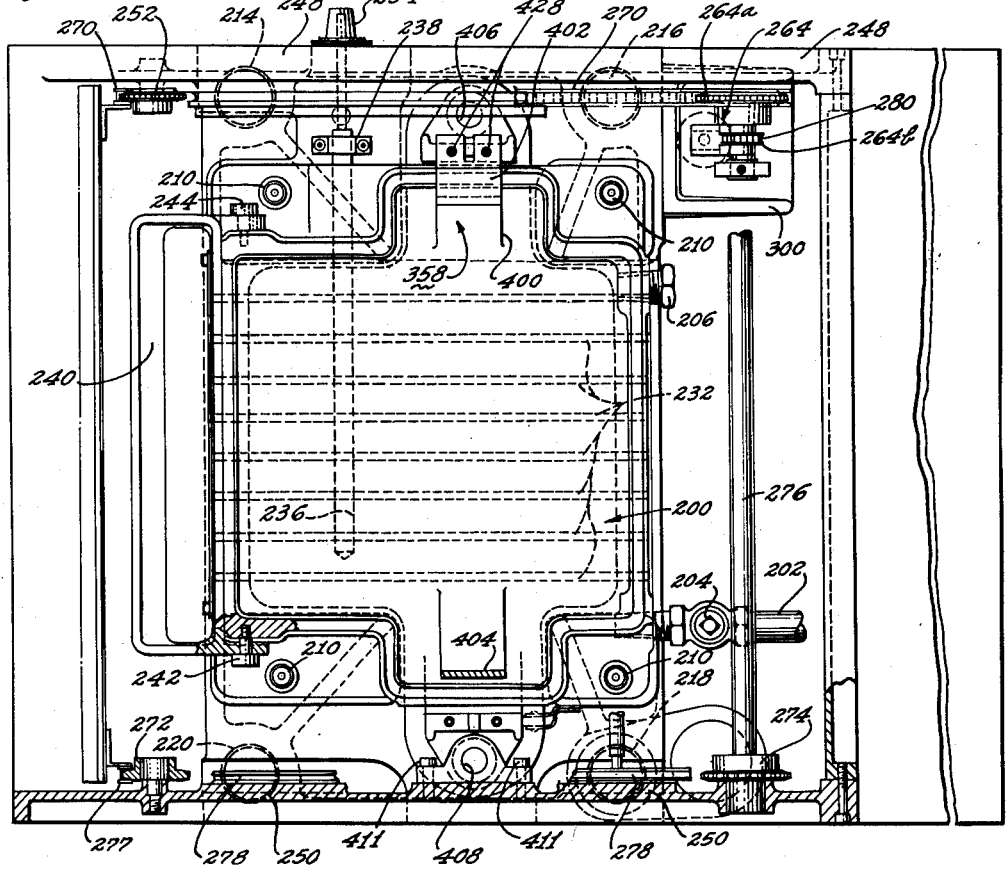
FIGURE 6 is a top plan view of the solder station of the invention and shows particularly the configuration of the molten solder container utilized at that station.

The mechanism at the solder station includes a container for molten solder which is indicated as 200, and which is shown in detail in FIGURES 4, 5 and 6. The molten solder container 200, for example, may be composed of stainless steel and it has a generally rectangular configuration.

Molten solder is fed to the container 200 through a pipe line 202 (FIGURES 5 and 6). The pipe line 202 is coupled to the interior of the container through a stop cock 204, the stop cock being threaded into the side of the container and communicating with the interior of the container. The stop cock 204 has a usual square head, and it may be opened and closed by a suitable tool. The container 200 also includes a drain cock 206 (FIGURE 6) which is threaded into the side of the container, and the drain cock enables the molten solder to be drained out of the container 200 when it is desired to service or clean the unit. The container 200 is supported on a supporting casting 208, and the container is fastened to the top of that casting by a plurality of screws 210 of the socket cap type.

The casting 208 is supported in spaced relation with a base casting 212 by four supporting posts 214, 216, 218 and 220. The supporting posts extend upwardly from each corner of the base casting 212 to corresponding corners of the casting 208, and these posts serve to support the casting 208 above the base casting and in spaced relation with the base casting. Each of the supporting posts has a lower end portion of reduced diameter which extends down into the base casting 212. For example, as shown in FIGURE 4, the post 214 has a lower portion 214a of reduced diameter which extends into the base casting 212. Likewise, and as shown in FIGURE 5, the post 218 has a portion 218a which extends down into the base casting 212, and the post 220 has a lower end portion 220a which extends down into the base casting. A corresponding plurality of jack screws 222, 224, 226 and 228 are threaded upwardly through the bottom of the base casting into respective engagement with the lower ends of the portions 214a, 216a, 218a, and 220a of the supporting posts. These screws take the downward thrust of the supporting posts, and they are adjustable to permit the container 200 to be precisely set in a horizontal plane. A series of tapered pins such as the pins 230 extend through respective ones of the reduced portions of the supporting posts in place in the lower casting.

The solder container 200 includues a series of conduits 232 which extend in spaced parallel relation through the bottom or floor of the container. These conduits receive appropriate heating elements which serve to maintain the solder in the container in a molten condition. The assembly also includes a thermo-switch 234. This switch has a control element 236 which extends into the bottom of the solder container 200 across the conduits 232. The control element for the switch is clamped to the casting 208 by means of a suitable clamp 238. The thermoswitch 234 controls the electrical circuit to the heating elements in the conduits 232 in known manner, so as to maintain the temperature of the container 200 at the level required for maintaining the solder in the container in its molten state.

A dross pot 240 is secured to one end of the container 200 by means of a pair of shoulder screws 242 and 244.

The dross pot has an open top which is substantially level with the top of the container 200 which also is open. A wiper blade 246 is supported in a manner to be described, and this blade is moved across the surface of the molten solder in the container 200 periodically to remove dross and other foreign matter from the top of the molten solder, such dross being deposited in the dross pot 240.

A pair of vertical castings 248 and 250 are mounted in spaced parallel relation on the opposite sides of the casting 208. The casting 248 supports an idler sprocket 252, which is rotatably mounted on the inner surface of the casting 248 adjacent the top of the solder container 200. A supporting bracket 254 is mounted on the left hand end of the side of the casting 208 in FIGURE 4. This supporting bracket supports a tension spring bracket 256. A transverse shaft 258 is supported at one end of the bracket 256, and this shaft has its other end supported in a similar tension bracket at the other side of the machine. The tension brackets tend to bias this shaft 258 downwardly in FIGURE 4. A second sprocket 260 is rotatably mounted on the shaft 258, and this latter sprocket is held against axial displacement by suitable collars and in axial alignment with the sprocket 252.

As shown in FIGURE 4, the shaft 258 extends across the mechanism a short distance below the casting 208. A third sprocket 262 is mounted on the inner surface of the casting 248, and this third sprocket is displaced slightly inwardly from the sprocket 252 (as shown in FIGURE 5) and slightly below the sprocket 252 (as shown in FIGURES 4 and 5). A dual sprocket 264 is rotatably mounted on the casting 248 to the rear of the solder container 200 (as shown in FIGURE 5). This sprocket 264 is adjacent the top of the container in substantially horizontal alignment with the sprocket 252. A rail 266 (FIGURE 5) is secured to the inner side of the casting 248, and this rail extends along the side of the container 200 between the sprockets 252 and 264. The rail is secured to the casting 248 by a series of screws 268.

A chain 270 (FIGURE 5) extends around the idler sprocket 252, down around the tensioned sprocket 260, and up over the sprocket 262. The sprocket 262 is also an idler sprocket. The chain 270 then continues around a first portion 264a of the dual sprocket 264 (which is a drive sprocket), and up over that portion and along the rail 266 to the idler sprocket 252. This chain 270 is tensioned due to the tensioning of the shaft 258 by the tension spring brackets, such as the bracket 256, at its opposite ends.

In like manner the casting 250 also rotatably supports a series of sprockets. An idler sprocket 272 (FIGURE 4) is rotatably mounted on the casting 250 in axial alignment with the idler sprocket 252, but on the other side of the solder container 200. A sprocket 273 corresponding to the sprocket 270 is rotatably mounted on the other end of the tension rod 258 in alignment with the sprocket 272. Likewise, an idler sprocket 275 corresponding to the sprocket 270 is rotatably mounted on the casting 250 in alignment with the sprockets 272 and 273. A drive sprocket 274 (FIGURE 6) is rotatably mounted on the casting 250 in axial alignment with the drive sprocket 264, and a drive rod 276 is interconnected between the sprocket 264 and the sprocket 274. A chain 277 is looped around the sprockets 272, 274 and 275 on the casting 250, and this chain extends around the sprocket 273 on the right hand end of the tension shaft 258 in FIGURE 4. The chain 277 extends along a guide rail 278 (FIGURE 6) on the opposite side of the container 200 and which is supported by the casting 250.

The dual sprocket 264 includes a first sprocket wheel 264a, as previously noted, around which the chain 270 extends; and it also includes a second sprocket wheel 264b around which a chain 280 extends. The tension shaft 258 maintains both the chains 270 and 272 taut about their corresponding sprockets. Then, as the chain 280 is driven to rotate the sprocket 264, the sprocket 274 is rotated through the shaft 276, and both the chains 270 and 277 move in their guide rails 266 and 278 on opposite sides of the container and across the top of the container in FIGURE 6.

The wiper 246 is secured to a crossbar 282 which, in turn, extends across from one of the chains 270 and 277 to the other. As the chains are moved in one direction with respect to the container 200, the wiper 246 is caused to move across the top of the molten solder in the container to skim the dross and other extraneous matter from the surface of the solder, and to deposit the same in the dross pot 240. Then, as the chains are moved in the opposite direction across the top of the container 200, the wiper 246 is returned to its original position. The crossbar 282 is rotatably mounted in the chains to permit the wiper 246 to rotate about the axis of that rod. A counterweight 284 is suspended at the left hand end of the rod 282 in FIGURE 4, and this counter-weight extends downwardly between the side of the container 200 and the casting 248. The counterweight 284 has a disk 286 rotatably mounted adjacent its lower edge in FIGURE 4.

As the chains 270 and 277 are moved to the left in FIGURE 5, the wiper 246 moves across the surface of the molten solder in the container 200 until it reaches the left hand side of the container. The wiper 246 is then moved by the chains over the side of the container 200 by pivoting it around the axis of the shaft 282. The wiper is in this manner moved into the dross pot 240. On the return movement of the chains to the right in FIGURE 5, the rotatable disk 286 of the wiper engages a guide 288 which is secured to the casting 248. This guide causes the wiper 246 to be held in an essentially horizontal position on its return stroke. Toward the end of its return stroke, the disk 286 moves down the tapered right end 288a of the guide 288 so that the wiper again assumes a vertical position. On its forward stroke, the disk 286 is below the guide 288 and does not ride in that guide.

The arrangement described in the preceding paragraph permits the wiper 246 to move across the surface of the molten solder as it is moved from the right to the left in FIGURE 5, and it then causes the wiper to be held up and away from the surface of the molten solder on its return stroke.

A cover is also secured to the chains 270 and 277. In the illustrated embodiment, this cover consists of a series of strips 290 of a heat-reflecting metal such as, for example, aluminum. Each of the strips 290 is secured to respective links of the chains 270 and 277 by a series of brackets, such as the brackets 292 (FIGURE 5). The strips 290 are supported in overlapping relationship so that when the chains are moved to the right in FIGURE 5, the cover is moved up over the top of the container 200 to close the container. However, when the chains are moved to the left in FIGURE 5, the strips 290 comprising the cover move over and down the side of the container.

Between the soldering cycles, the equipment is in the condition shown in FIGURE 5, with the cover strips 290 extending across the top of the container 200, and with the wiper 246 at one side of the container. Then, when a printed circuit board is brought into place over the solder station, the drive chain 280 is actuated to move the chains 270 and 277 to the left in FIGURE 5. This causes the cover strips 290 to be moved away from the top of the container 200, and it also causes the wiper 246 to move across the top of the molten solder in the container. The strips 290 now assume positions down one side of the container 200, and the wiper is moved to the left side of the container in FIGURE 5. At the termination of the soldering cycle, the chains 270 and 277 are moved back to the right in FIGURE 5 to return the wiper to its illustrated position and to cause the cover strips 290 again to close the top of the container.

An L-shaped bracket 300 is secured to the right hand side of the casting 208 in FIGURE 5. The bracket 300 is supported on the side of the casting 208 by a plurality of setscrews 302 (FIGURE 5A). A hydraulic cylinder 304 is supported on a lower bracket 306 which, in turn, is mounted on the base casting 12 by a plurality of setscrews such as the screws 308. The hydraulic cylinder 304 is pivotally mounted on the bracket 306 by means of a bar 310 which is held in position by cotter pins such as the pin 312. The hydraulic cylinder 304 is mounted in a generally vertical position and its piston 314 extends upwardly through an aperture in the bottom of the bracket 300.

A pair of vertically extending tension mounting brackets 316 and 318 (FIGURE 5A) are mounted in spaced parallel positions on the bracket 300. This is achieved by means of a pair of screws 320 and 322 extending through the bottom of the bracket. A shaft 323 is supported by the brackets 316 and 318 and extends between these brackets. This shaft is resiliently biased downwardly by the brackets. A drive sprocket 324 is mounted on the shaft 323 in alignment with the sprocket wheel portion 264b of the dual sprocket 264, and the drive chain 280 extends around the sprocket 324.

The spring brackets 316 and 318, as pointed out above resiliently bias the sprocket shaft 323 and the sprocket 324 downwardly to maintain the drive chain 280 taut. A clamp 330 is mounted on the piston 314, and this clamp is secured to the drive chain 280. The arrangement is such that when the piston 314 moves upwardly at the beginning of a soldering cycle in response to the introduction of fluid into the hydraulic cylinder 304, the drive chain 280 rotates the drive sprockets 264 and 274, (FIGURE 6) to move the cover strips 290 to an open position and to cause the wiper 246 to move across the top of the solder in the container 200. At the end of the soldering cycle and when the fluid is released from the cylinder 304, the piston 314 returns to move the chain 208 in the opposite direction and thereby cause the wiper and cover to return to their positions illustrated in FIGURE 5.

A microswitch 332 is mounted on the supporting post 218, and this microswitch includes an actuating arm 334. Whenever the piston 314 is returned to its lower position, a projection on the piston engages the arm 334 to actuate the microswitch 332.

Figure 4A:
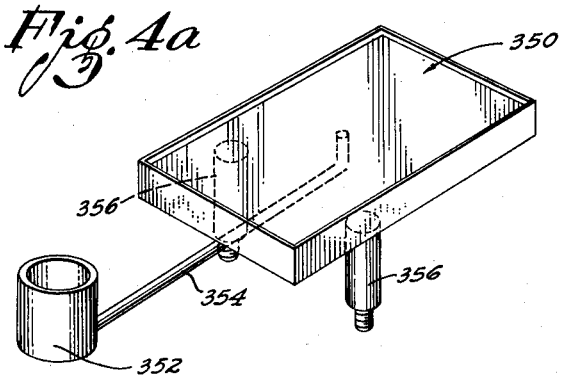
FIGURE 4A is a perspective view of the solder applicator shown in FIGURE 4.

A solder applicator 350 is supported in the container 200 in a manner to be described. The solder applicator, as best shown in FIGURE 4A, includes a rimmed upper surface. A solder reservoir is also included in the container 200, and this reservoir is designated as 352. A conduit 354 which, for example, may be a ⅛-inch pipe, intercouples the reservoir 352 with the applicator 350. The applicator 350 has a plurality of legs, such as the legs 356, to support the applicator on an elevator 358 which extends across the bottom of the container 200.

The reservoir 352, like the applicator, has an open top, and as these two elements are moved upwardly together in the molten solder in the container 200, a quantity of solder forms in the rimmed upper surface of the applicator 350 and in the reservoir 352. The reservoir is in fluid connection with the rimmed upper surface of the applicator through the conduit 354. Therefore, the level of the solder on the rimmed upper surface of the applicator may be controlled by the level of the solder in the reservoir. As noted above, both the solder reservoir and the applicator are moved upwardly out of the solder in the container 200 by the elevator 358.

The elevator 358 comprises a horizontal metallic strip 400 which extends across the bottom of the container 200 and to which the legs 356 of the applicator 350 are affixed. The reservoir 352 is supported on this strip by means of the conduit 354 which extends across the strip (FIGURE 5). The strip 400 is secured by welding, or any other suitable means, to an S-shaped metallic bracket 402 at one end and to an S-shaped metallic bracket 404 at its other end (FIGURE 4). The bracket 402 extends vertically upwardly along one side of the container 200, and it has a horizontal upper portion that extends over the edge of the container. Likewise, the bracket 404 extends vertically upwardly along one side of the container, and this latter bracket also has a horizontal upper portion which extends over the edge of the container.

The mechanism includes two spaced vertical rods 406 and 408 which are mounted on the base 212 by means of suitable brackets, such as the bracket 410 which is shown in FIGURE 4 as supporting the rod 408. The bracket 410 is secured to the base 212 by a pair of screws 412 and 414. The rod 406 extends upwardly adjacent one side of the container 200 and its upper end is affixed to the casting 248 by means of a bracket 407, the bracket 407 being secured to the casting 248 by suitable screws. The vertical rod 408, on the other hand, extends up the opposite side of the container 200, and the upper end of this latter rod extends through a bracket 409 which is secured to the casting 250 by means of a pair of screws 411 (FIGURE 6).

A first riser 416 is slidably mounted on the rod 406 by means of a pair of ball bearing bushings 418 and 420. These bushings are constructed in known manner to permit the riser 416 freely to slide up and down on the rod 406. A second rider 422 is slidably mounted on the rod 408 by means of a pair of bushings 424 and 426. The bushings 424 and 426 may be similar to the bushings 418 and 420 and they permit the riser 422 freely to slide up and down on the rod 408. The upper horizontal portion of the bracket 402 is secured to the upper end of the riser 416 by means of a pair of screws 428. Likewise, the upper horizontal portion of the bracket 404 is fastened to the top of the riser 422 by means of a pair of screws 430. A horizontal riser connector bracket 432 extends across the machine and interconnects the risers 416 and 422. The bracket 432 is fastened to the riser 416 by means of a pair of screws 434, and this bracket is secured to the riser 422 by means of a pair of screws 436.

An upwardly extending vertical screw 438 is threaded into the central portion of the bracket 432. The screw 438 has a pad 440 affixed to its upper end. This pad engages the underside of the casting 208 when the bracket 432 is in its upper position. The pad 440 and its screw 438 are adjustable, and these elements serve to limit the upward travel of the elevator 358. Convenient adjustments may be made in the pad 440 and the screw 438 so that the elevator 358 in its upper position moves the applicator 350 to a position with its rims just touching the underside of the printed circuit board positioned over the container 200.

A hydraulic cylinder 442 is vertically mounted on a platform 444, the platform being affixed to the base 212 by means of a plurality of screws 446. The piston 448 of the hydraulic cylinder 442 is secured to the connector bracket 432. Hydraulic actuating fluid is supplied to the cylinder 442 from an accumulator 450 through a pipeline 452. The accumulator 450 is mounted on the supporting post 218 by means of a pair of clamps 454 and 456. The accumulator supplies hydraulic fluid to the cylinder 442 in a controlled manner as will be described. When such fluid is introduced to the cylinder 442, the piston 448 moves upwardly and causes the bracket 432 to move the risers 416 and 422 to their upper elevated position. This causes the elevator 358 to move the applicator 350 up under a positioned printed circuit board, and it also causes the elevator to move the reservoir 352 to its upper elevated position.

A microswitch 460 is mounted on the rod 408 by means of an appropriate mounting bracket or clamp 462. The microswitch 460 has an armature 464, and this armature is engaged by the lower surface of the riser 422 when the riser is moved downwardly to its lower position. The microswitch, therefore, is actuated when the elevator 358 is in its lower position.

The hydraulic cylinder 442 which operates the elevator 358 may, for example, have a 6" stroke and a 1½" bore, and it may be of the type presently marketed by the Hanna Company, and indicated by them as their model #T7154. The hydraulic cylinder 304 which operates the wiper 246 and cover strips 290, on the other hand, may have a 1½" bore and a 7" stroke. This latter hydraulic cylinder may be of the type now being marketed by the Weldon Engineering Company, and designated by them as their model SM3.

A tubular mounting bracket 470 is threaded to a threaded portion of the supporting post 218. This mounting bracket supports a microswitch 472. The microswitch has an actuating arm 474 which is pivoted at 476. This arm is normally spring biased in a counterclockwise direction in FIGURE 5 to actuate the switch to one of its two operating conditions. A roller 478 is mounted on the free end of the arm 474. The microswitch 472 is included in a control circuit which, in a manner to be described, causes the elevator 358 to slow down during the upper portion of its travel. That is, the elevator is caused to approach the positioned printed circuit board at a reduced rate during the last stage of its upward travel by the actuation of the switch 472 by a cam surface 482 on the riser 422. Likewise, the applicator is retracted from the underside of the positioned board at the reduced rate, and the elevator proceeds downwardly at such a reduced rate until the cam surface 482 disengages the roller 478 and permits the microswitch 472 to be actuated by spring bias to its original operating condition.

Figure 7:
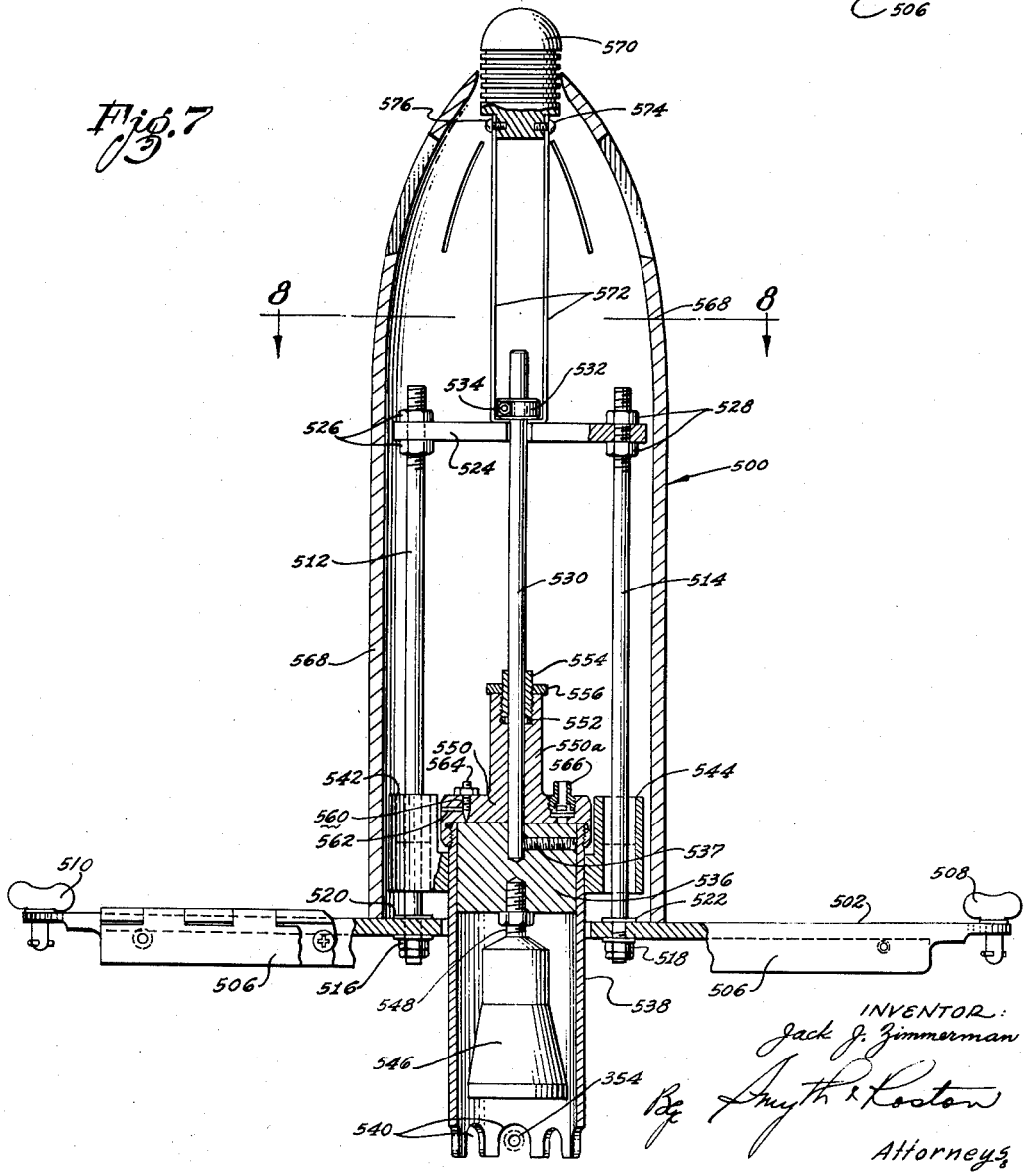
FIGURE 7 is a side elevation, partly in section, of a solder displacer which is used in the mechanism of one embodiment of the invention and which is controlled to displace solder upwardly in the solder applicator when the latter is moved to its raised soldering position under a positioned printed circuit board.
Figure 9:
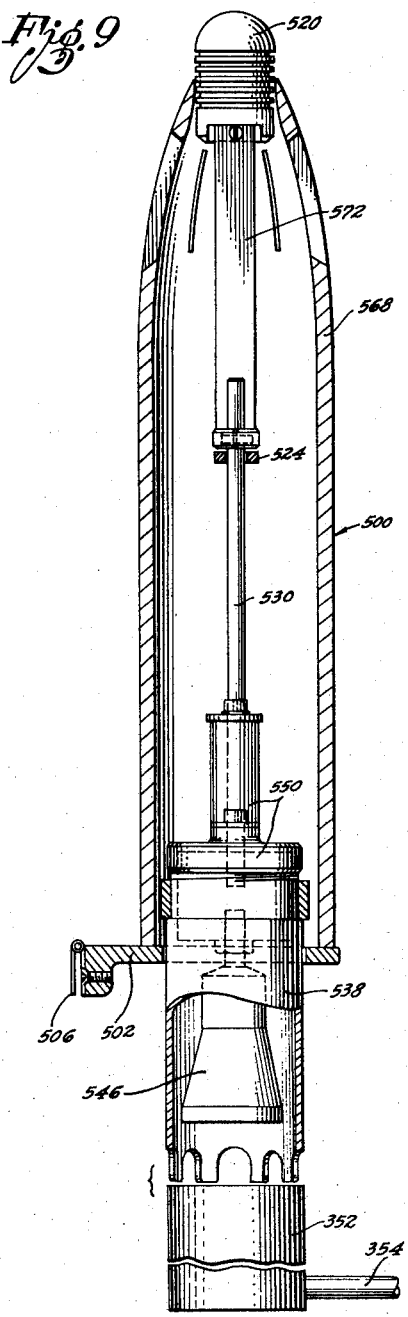
FIGURE 9 is a side elevational view, partly in section, of the solder displacer of FIGURE 7 and taken at approximately right angles to the view of FIGURE 7.

The solder displacing unit which is shown in detail in FIGURES 7, 8, 9 and 10 is designated generally as 500, and the unit is mounted on a hinged supporting cover 502. As shown in FIGURES 1 and 7, the cover 502 is hinged to a supporting bracket 504 by means of a suitable hinge 506. The displacer unit 500 is mounted on the bracket 504 which, in turn, is mounted on the cylindrical guide rail 100 (FIGURE 1). The solder displacer 500 is so mounted to be positioned radially outwardly from the pallets 74, 76, 78, 80, 82 and 84, as shown in FIGURE 3. Therefore, the solder displacer does not impede the movement of the pallets. The hinged cover 502 is held in place by a pair of rotatable wing-type latches 508 and 510. One of the pallets is also hinged, and when that pallet is arrested adjacent the solder displacer it can be turned up and out of the way. Then the latches 508 and 510 can be released to permit the solder displacer to be turned about the hinge 502 for replacement or servicing purposes.

The solder displacing unit includes a pair of spaced parallel guide rods 512 and 514 which extend through the cover 502 and vertically upwardly from the cover. The guide rods are mounted in the cover by suitable nuts 516 and 518 and by collars 520 and 522. In this manner, the guide rods 512 and 514 are held upright in a spaced parallel position on the cover 502. A horizontal guide rod spacer plate 524 extends between the guide rods 512 and 514 at the upper ends of these guide rods. The spacer plate 524 is held in place on the top of the guide rod 512 by means of a pair of nuts 526 which are threaded to the guide rod above and below the spacer plate. In like manner, the spacer plate is held on top of the guide rod 514 by means of a pair of nuts 528 which are threaded to the guide rod 514 above and below the spacer plate.

The spacer plate 524 has a central aperture, and a vertical reciprocating piston rod 530 extends through that aperture. A collar 532 is clamped to the upper end of the piston rod 530 by means of a suitable screw 534. This collar limits the downward motion of the piston rod and is adjustable merely by loosening the screw 534 and moving the collar along the piston rod.

A piston 536 is fastened to the lower end of the piston rod 530 by means of a set screw 537. The set-screw 537 is threaded through a threaded hole in the piston which extends radially from a longitudinal bore in the piston that receives the piston rod. The set screw 537 is threaded into a notch in the piston rod so that the piston may be securely held at the end of the piston rod.

The piston 536 is slidably mounted within a cylinder 538. The cylinder 538 is mounted in a generally vertical position and it has an open bottom. The solder displacing unit is so positioned by the bracket 504 (FIGURE 1), that the cylinder 538 is adapted to extend into coaxial relation with the reservoir 352 (FIGURE 9) to be lifted upwardly by the reservoir as the reservoir is moved to its upper elevated position. The bottom of the cylinder 538 has a series of arches 540 formed in its lower rim. These arches permit the molten solder in the reservoir freely to overflow. The cylinder 538 has a pair of ears 542 and 544 which function as guides and which slide on the respective guide rods 512 and 514.

A bell weight plunger member 546 has an upwardly extending threaded stud portion 548, and this stud portion is threaded into a longitudinal central threaded bore in the lower surface of the piston 536. The bell weight plunger member 546 functions as a solder displacing plunger, and this plunger moves downwardly in the cylinder 538 with the piston 536 to displace solder in the reservoir 352 in a manner to be described.

A cylinder head 550 is threaded to the upper portion of the cylinder 538 and encloses the upper end of the cylinder. This cylinder head has a central elongated portion 550a through which the piston rod 530 extends. The upper end of the elongated portion 550a of the cylinder head 550 has a recess formed in it, and an O-ring 552 is disposed in the recess around the piston rod 530 to seal the piston rod and the cylinder head. An O-ring spreader 554 is threaded into the orifice, and a lock nut 556 is threaded into the spreader to hold the assembly securely in place.

A needle valve 560 is mounted on the cylinder head 550, and this valve extends through the cylinder head to the interior of the cylinder 538. The valve 560 includes a horizontal passage 562, and it also includes a vertical adjustable "needle" 564 which may be adjusted to control the amount of air passing from the passageway 562 into the interior of the cylinder 538. A flapper exhaust valve 566 is also threaded into the cylinder head 550, and the exhaust valve also extends into the interior of the cylinder 538. This latter valve operates in known manner to close during the downward stroke of the piston 536, but to open and provide a free exhaust path for air in the cylinder while the piston 536 is undergoing its upward stroke.

Figure 10:
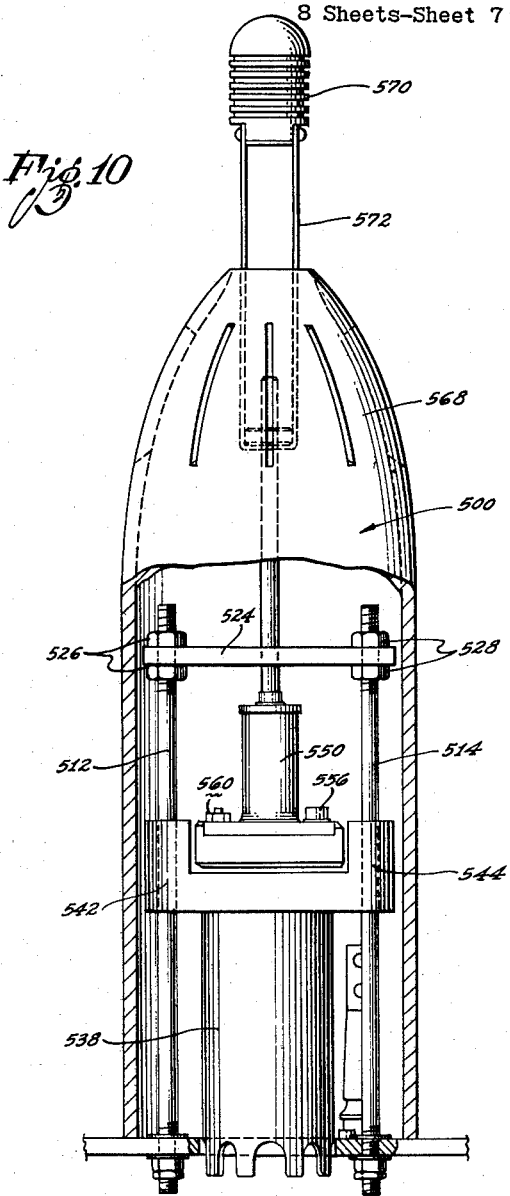
FIGURE 10 is a side elevational view of the solder displacer with its piston and cylinder retracted to permit the pallets of the conveyor to move under the displacer from one position to the next.

The assembly is surrounded by a tubular casing 568. This casing has an aperture in its top end, and a threaded lift knob 570 extends through the aperture and is supported in the aperture. The lift knob 570 is supported by the cover 568, and it extends through the aperture at the top of the cover into the interior of the unit. A sling bracket 572 is secured to the bottom of the knob 570 by a pair of screws 574 and 576. The lower end of the sling bracket 572 engages the collar 532. Therefore, the knob 570 may be moved upwardly to move the piston 530 and to draw the cylinder 538 with the piston upwardly beyond the plane of the cover 502. The assembly in its retracted position is shown in FIGURE 10.

Figure 8:
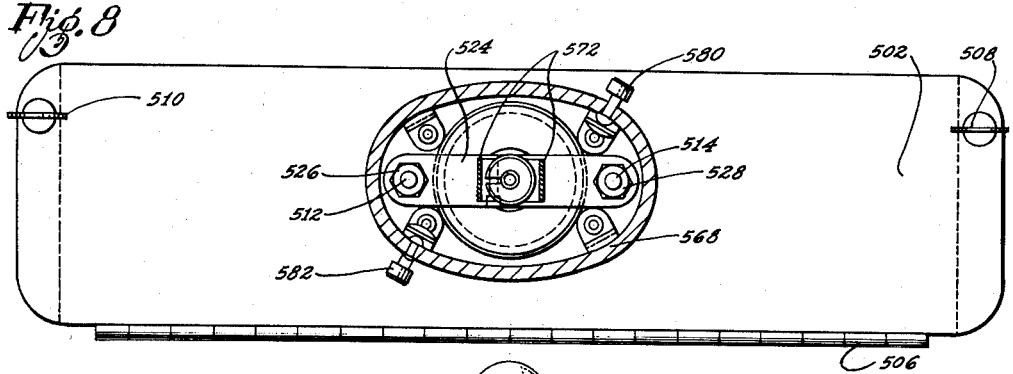
FIGURE 8 is a partial plan view and partial cross-sectional view of the solder displacer of FIGURE 7, substantially on the line 8—8 of FIGURE 7, and particularly shows a hinged cover bracket on which the applicator is mounted.

The casing 568 may be secured to the cover 502 by any suitable spring-loaded latches such as the push button type of resilient latches 580 and 582 shown in FIGURE 8. These latches release the cover upon the depression of the push buttons associated with them.

As the elevator 358 moves the applicator 350 and the solder reservoir 352 to their upper positions, the reservoir 352 moves the cylinder 538 upwardly along the guide rods 512 and 514 to its upper position. Due to the inability of the needle valve 560 to admit air quickly to the interior of the cylinder 538, the piston 536 and the plunger 546 are also carried upwardly by the cylinder. Then, as the cylinder is moved upwardly to its upper position, the piston 536 begins to travel slowly downward in the cylinder as the valve 560 admits air to the cylinder from the passageway 562. The rate of downward travel of the piston 536 is adjustable by adjusting the position of the needle 564. As the piston 536 moves downwardly in the cylinder 538, the plunger 546 displaces the solder that has moved into the cylinder from the reservoir 352 through the arches 540. This solder displacement causes the molten solder to rise in the reservoir 352. The reservoir 352 is in fluid connection with the applicator 350 through the conduit 354. Therefore, the rise of solder in the reservoir produces a corresponding rise of solder in the top of the applicator so as to apply solder to the underside of a positioned printed circuit board. The walls of the reservoir 352 are made of such a height that the solder overflows and falls back into the container 20 before the solder in the applicator 350 has been raised to such an extent that it floods over the top of the positioned printed circuit board. The applicator itself is preferably tinned to preclude any tendency of the molten solder in the applicator to form a meniscus. In this manner the level of the top surface of the molten solder in the applicator can be precisely controlled to prevent flooding of the positioned printed circuit board, as described above.

The piston 536 and its associated solder displacing plunger 546 continue on their downward solder displacing motion until the collar 532 contracts the stationary bracket formed by the spacer plate 524. Now, and at the termination of the soldering operation, the reservoir 352 is moved to its lower position and the cylinder 538 falls with it. This causes the piston 536 to move upwardly with respect to the cylinder and the air in the cylinder is rapidly exhausted through the flapper exhaust valve 536. This enables the cylinder 538 to be rapidly returned to its lower position, so that the unit may be quickly placed in readiness for the next soldering cycle.

The plunger 546 can be suitably contoured in any desired manner to control the rate at which the solder level is raised in the applicator 350. For example, the plunger may be shaped to initially raise the solder level in the applicator relatively rapidly, and then to gradually slow down the rate at which it is being raised.

The control system of FIGURE 11 includes a pair of input terminals 600 which may be connected to any suitable alternating current source. One of the terminals 600 is grounded, and the other is connected to the armature of the switch 58 of FIGURE 1. It will be remembered that this switch is controlled by the switch actuator 56 mounted on the shaft 22. The switch 58 is a single-pole, double-throw switch, and its armature normally engages the upper fixed contact of the switch. However, when the shaft 22 reaches an angular position corresponding to the start of the dwell of the cam 24, and when one of the pallets precisely positions a printed circuit board over the solder station, the armature of the switch 58 is moved into engagement with the lower fixed contact of the switch. The upper fixed contact of the switch 58 is connected to one terminal of a control 602 for the motor 20. The other terminal of this control is grounded. Whenever an alternating voltage is introduced across the terminals of the control 602, the motor 20 is energized and it rotates its drive shaft 22.

The lower fixed contact of the switch 58 is connected to a terminal "1" of a timer 604. The timer 604 may have any known construction and it may be any of the many known types of electric timers. The illustrated timer includes terminals indicated "1," "2," "3" and "4," and a terminal "C." The timer is so constructed that when an alternating voltage is introduced across the terminals "1" and "2," a connection is made from the terminal "c" to the terminal "3" after a selected time interval, and a second connection is made from the terminal "c" to the terminal "4" (with the original connection being broken) after a second longer time interval.

The terminal "1" of the timer 604 is connected to the terminal "c" and the terminal "2" is grounded. The terminal "3" of the timer is connected to the armature of the limit switch 460 which was described previously. It will be remembered that the switch 460 is actuated when the applicator 350 is in its lower position. When the switch 460 is actuated its armature contacts its fixed contact.

The fixed contact of the switch 460 is connected to one side of the energizing winding of a solenoid valve 606. The other terminal of this winding is grounded. The solenoid valve 606 is interposed in a pipe line 608 which connects the hydraulic cylinder 304 to a source of hydraulic fluid suitable for operating the cylinder 304. When the solenoid valve 606 is energized, it causes the fluid to be introduced to the cylinder 304 to open the cover 290 and to move the wiper 246 across the molten solder in the container 200.

The terminal "4" of the timer 604 is connected to the armature of the wiper limit switch 332. This latter switch is closed whenever the piston 314 of the cylinder 304 is in its upper position, so that the cover 290 is open and the wiper 246 is in the dross pot 240 (having completed its wiping function). The fixed contact of the switch 332 is connected to the terminal "1" of a second timer 610. The timer 610 may be similar to the timer 604, and like the timer 604, the timer 610 completes a connection from its common terminal "c" to its terminal "3" a selected time after an alternating voltage has been impressed across its terminals "1" and "2." Then, the timer 610 breaks the connection between the terminals "c" and "3," completes a circuit between the terminal "c" and the terminal "4." This occurs after an additional time interval subsequent to the introduction of the alternating voltage across the terminals "1" and "2" has elapsed.

The terminal "2" of the timer 610 is grounded, and its terminal "c" is connected to the armature of the switch 332. The terminal "3" is connected to one side of the energizing winding of a solenoid actuated valve 612. The other side of this energizing winding is grounded. The solenoid valve 612 is interposed in a pipe line 614 which supplies hydraulic fluid from a pressure source to the accumulator 450. The terminal "4" of the timer 610 is connected to one side of the energizing coil of a solenoid actuated valve 616. The other side of this coil is grounded. The solenoid valve 616 is interposed in a line 618 which constitutes an exhaust line for the accumulator 450.

The limit switch 460 is a 2-pole type and its second component is indicated as 460'. It will be understood that both the switches 460 and 460' operate in unison. The terminal "4" of the timer 610 is connected to the armature of the switch 460'. The fixed contact of the switch 460' is connected to one side of the energizing coil of a solenoid actuated valve 620. The other side of this coil is grounded. The solenoid actuated valve 620 is interposed in the exhaust line 622 from the wiper and cover cylinder 218.

The microswitch 472 has one terminal connected to a voltage source 624, and the other terminal of this switch is connected to one terminal of the energizing winding of a solenoid actuated valve 626. The other terminal of the energizing winding of the solenoid valve 626 is connected to the other terminal of the voltage source 624. The solenoid valve 626 is interposed in the conduit 452 which couples the accumulator 450 to the cylinder 442 that controls the elevator 358 for the applicator 350. The conduit 452 has a relatively large cross section. A second conduit 630 of relatively small cross section, also couples the accumulator 450 to the cylinder 442. A manually operated valve 632 is interposed in the conduit 630.

To activate the system, a main switch (not shown) is closed to apply an alternating voltage across the input terminals 600 and energize the control 602 of the motor 20. The control is energized through the switch 58 in its upper position. The shaft 22 now begins to rotate the pallets 60, 61, 62, 64, 66 and 68 (FIGURE 2) from one angular position to another. When the cam 26 of the drive assembly 24 of FIGURE 1 reaches its dwell position, one of the pallets is precisely positioned by the drive assembly over the solder station, as previously described. At this time, the limit switch 58 is moved to its lower contact by the actuator 56 to de-energize the control 602 which, in turn, causes the motor 20 to be de-energized. The de-energizing of the motor 20 causes the shaft 22 to stop, and this permits the positioned pallet to be arrested over the solder station.

At this time, the switch 460 is closed because the applicator is assumed to be in its lower position. After a time interval determined by the timer 604, a connection is established between its terminals "c" and "3" the solenoid 606 is energized. The energizing of the solenoid 606 permits hydraulic fluid under pressure to be introduced to the cylinder 304 which causes the cylinder piston 214 to move upwardly. This, in turn, causes the cover 290 to open and the wiper 246 to move across the surface of the molten solder and clean that surface in the manner described.

As the wiper piston 314 leaves its lower position and moves upwardly, the switch 332 closes. Then, after a time interval determined by the timer 604, and which is selected to occur after the cover 290 has reached its fully opened position and after the wiper 246 has completed its wiping of the dross from the surface of the molten solder in the dross pot 240, its terminal "c" closes with its terminal "4" and the alternating voltage from the input terminals 600 is introduced through the closed switch 332 across the terminals "1" and "2" of the timer 610. Now, after an interval determined by the timer 610, it closes its "c"—"3" terminals. The alternating voltage from the terminal "4" of the timer 604 (which is introduced to the terminal "c" of the timer 610) is now impressed on the terminal "3" of the timer 610, so that this voltage may be introduced across the energizing winding of the solenoid valve 612. Therefore, the valve 612 is energized a selected time after the cover 290 has been opened and after the surface of the molten solder in the container 200 has been wiped by the wiper 246. The energizing of this valve 612 causes pressurized hydraulic fluid to flow through the line 614 to the accumulator 450.

The fluid introduced to the accumulator 450 flows through the conduits 452 and 630 to the cylinder 442. The valve 626 is now open so that the actuating fluid flows at a relatively high rate into the cylinder 442. The elevator 358, therefore, begins a rapid ascent to raise the applicator 350 and the reservoir 352 to their upper elevated positions. This causes the limit switch 460 to open. The valve 606 is now closed holding the piston 314 of the cylinder 304 in its extended position.

As the elevator 350 reaches the upper portion of its travel, the cam surface 482 of the riser 422 (FIGURE 5) meets the roller 478 to actuate the switch 472. This causes the switch 472 to energize and close the valve 626 in the conduit 452, and the hydraulic fluid from the accumulator 450 can now flow only through the smaller conduit 630 to the cylinder 442. This greatly reduces the rate at which the applicator 350 approaches its uppermost position. This reduction in the rate of speed of the applicator causes the heat from the molten solder carried by the applicator 350 to gradually warm the underside of the positioned printed circuit board. This aids materially in preserving the printed circuit boards treated by the machine of the invention. Also, this slowing down of the applicator as it reaches the top of its travel obviates the tendency for the molten solder to be splashed out of the applicator when it is finally brought to a stop.

The speed at which the applicator 350 approaches the underside of the positioned printed circuit board may be controlled by the manual adjustment of the valve 632 in the conduit 630.

The pad 440 and its supporting screw 438 of FIGURE 4 are adjusted so that the elevator 358 continues its upward travel until the applicator just touches the underside of the positioned printed circuit board. Then, the above-described controlled action of the solder displacer plunger 546 of FIGURE 7 in the reservoir 352 causes the solder to rise up in the top rimmed surface of the applicator 350 effectively to solder the metallic terminal connections on the underside of the positioned printed circuit board.

After the soldering operation has been completed, as timed by the timer 610, the timer 610 breaks the connection between its "c" terminal and its terminal "3" and makes a connection between its "c" terminal and its terminal "4." This causes the solenoid valve 612 to be de-energized to cut off the supply of fluid to the accumulator 450. At the same time, the solenoid valve 616 in the exhaust line 618 is energized to permit the fluid to be exhausted from the accumulator. The cylinder 442 now starts its downward travel. However, the solenoid valve 626 in the conduit 452 is still energized so that the applicator 350 is retracted very slowly from the positioned board. This, as previously noted, prevents the formation of stalactites on the soldered joints. However, when the cam 482 releases the cam follower roller 478, the valve 626 is de-energized by the resulting opening of the switch 472, and the larger conduit 452 is again opened. Therefore, the elevator 358 continues rapidly down for the remaining portion of its downward stroke so that there will be no unnecessary time consumed in the soldering cycle.

When the elevator 358 reaches the bottom of its downward motion, the riser 422 again actuates the microswitch 460 to close that switch. The closure of the portion 460' of the switch causes the alternating voltage at the terminal "4" of the timer 610 to be introduced across the energizing winding of the solenoid valve 620 in the exhaust line of the cylinder 304. This releases the hydraulic fluid and causes the piston 314 of that cylinder to return to its lower position to close the cover 290 and to return the wiper 246 to its closed position of FIGURE 5.

When the piston 314 has so returned to its lower position, the limit switch 332 opens to de-energize the timer 610. Prior to that, however, a second portion 332' of this limit switch closes to energize the control 602 for the motor 20. The energizing of the control 602 causes the motor 20 to move the pallets on to the next station. The limit switch 58 immediately moves to its upper position to maintain the control 602 energized, and to de-energize the timers 604 and 610. The machine now approaches the next cycle and it repeats the operations described above.

The invention provides, therefore, a new and improved automatic soldering machine. The soldering machine of the invention functions in an improved manner and overcomes many of the problems prevalent in this general type of machine. Moreover, the improved machine of the invention is relatively simple in its construction and performs a solder operation at a relatively rapid rate. Specifically, provisions are made so that the solder applicator returns to its lower position at a relatively fast speed, and other features which have been described are incorporated to speed up the soldering cycle.

What is claimed is:

1. An automatic soldering machine for printed circuit panel assemblies, and the like, including: a container for molten solder having an open top, solder applicator means having a pan-like configuration with a rimmed upper surface and positioned within said container, a molten solder reservoir having an upper rim defining an open top and positioned within said container with its upper rim in substantially uniplanar relationship with the rimmed upper surface of said applicator, conduit means extending between said reservoir and said solder applicator means for establishing a fluid connection between said reservoir and the rimmed upper surface of said applicator, elevator means for supporting said applicator means and said reservoir within said container and for moving the same between a lower position in which the top of said reservoir and the upper rimmed surface of said applicator are below the normal level of molten solder in the container and an upper position in which the rimmed upper surface of said applicator extends into the plane of said open top of said container, and a solder displacement unit mounted above said container and including a displacement element in vertical alignment with said reservoir and adapted to extend down into the open top of said reservoir and displace solder in said reservoir when said reservoir is in its upper position and thereby displace solder upwardly in the rimmed upper surface of said solder applicator means into a solder contact position.

2. The combination defined in claim 1 and which includes an hydraulic drive means for said elevator, means for introducing a fluid under pressure to said hydraulic drive means to cause said elevator to move said applicator means from its lower position to its upper position at a relatively rapid rate, means for subsequently releasing the fluid introduced to said hydraulic drive means to cause said applicator means to return to its lower position, and control means for restricting the introduction of such fluid to said hydraulic drive means as said applicator means approaches its upper position and for restricting the release of such fluid from said hydraulic drive means as said applicator recedes from its upper position so as to reduce the speed of said applicator as it approaches and leaves its upper position.

3. The combination defined in claim 2 and in which said hydraulic drive means includes a first relatively large conduit and a second relatively small conduit, and said control means includes a valve in said first conduit for interrupting the flow of said fluid through said first conduit as said applicator approaches and leaves its upper position.

4. The combination defined in claim 3 and in which said valve includes a solenoid actuator, in which said control means includes a switch for completing a control circuit to said solenoid actuator, and in which a switch-actuating member is coupled to said elevator means to actuate said switch to one of its operating conditions when said applicator is in the region of its upper position.

5. The combination defined in claim 1 and in which said solder displacement unit includes a cylinder positioned over said container in vertical alignment with said reservoir and movable upwardly by said reservoir as said reservoir is moved to its upper position, a piston slidably mounted in said cylinder and movable upwardly therewith as said cylinder is moved upwardly to an upper position by said reservoir, said piston being adapted to move downwardly in said cylinder after said cylinder is so moved to its upper position, a solder displacing plunger mounted on said piston and movable down into said reservoir as said piston moves downwardly in said cylinder, stationary bracket means, a piston rod extending from said piston and through said bracket means in slidable relationship therewith, and stop means mounted on said piston rod for engaging said bracket means for limiting the downward movement of said piston in said cylinder when said reservoir is in its upper position.

6. An automatic soldering machine for printed circuit panel assemblies and the like including: a stationary frame; a container for molten solder mounted on said frame; solder applicator means positioned within said container and movable therein between a lower position and an upper position; elevator means mounted on said frame and having a movable portion extending into said container and coupled to said applicator for moving said applicator between its lower and upper positions; a molten solder reservoir positioned within said container having a top in substantially uniplanar relationship with the top of said applicator and movable with said applicator between a lower and an upper position; conduit means coupling said reservoir to said applicator for establishing a flow path for molten solder from said reservoir to said applicator; a solder displacing unit mounted on said frame and including, a cylinder having a closed upper end positioned over said container in vertical alignment with said reservoir and movable upwardly from a lower position to an upper position by said reservoir as said reservoir is moved to its upper position, a piston slidably mounted in said cylinder and movable therewith as said cylinder is moved upwardly by said reservoir, inlet valve means mounted on said cylinder to provide a restricted air path to the interior of said cylinder so as to permit said piston to move downwardly in said cylinder at a relatively slow speed after said cylinder has been moved upwardly by said reservoir to its upper position, a solder displacing plunger mounted on the lower end of said piston to be moved down into said reservoir as said piston moves downwardly in said cylinder, bracket means mounted on said frame and extending across the path of said cylinder over said closed upper end thereof, an elongated rod coupled to said piston and extending upwardly therefrom through the closed upper end of said cylinder and through said bracket means in slidable relationship with said closed end and with said bracket means, stop means mounted on the upper end of said rod to engage said bracket means and limit the downward movement of said solder displacing plunger in said reservoir when said reservoir and said cylinder are in their upper positions and for holding said pistons stationary when said reservoir and said cylinder move to their lower positions, an outlet valve means mounted on said cylinder for providing an exhaust path from the interior of said cylinder as said cylinder moves to its lower position to permit such motion of the cylinder to proceed at a relatively high speed.

7. The soldering machine defined in claim 6 in which said inlet valve means comprises an intake needle valve mounted on and extending through said closed upper end of said cylinder, and in which said outlet valve means comprises an exhaust flapper valve mounted on and extending through said closed upper end.

8. A fluid displacing unit including: a cylinder having a closed upper end and movable between a lower position and an upper position, a piston slidably mounted in said cylinder and movable therewith as said cylinder is moved upwardly, inlet valve means mounted on said cylinder to provide a restricted air path to the interior of said cylinder so as to permit said piston to move downwardly in said cylinder at a relatively slow speed after said cylinder has been moved to its upper position, a fluid displacing plunger mounted on the lower end of said piston to be moved downwardly thereby as said piston moves downwardly in said cylinder, stationary bracket means extending across the path of said cylinder over said closed upper end thereof, an elongated rod coupled to said piston and extending upwardly therefrom through the closed upper end of said cylinder and through said bracket means in slidable relationship with said closed end and with said bracket means, stop means mounted on the upper end of said rod to engage said bracket means and limit the downward movement of said fluid displacing plunger when said cylinder is in its upper position and for holding said piston stationary when said cylinder moves to its lower position, and outlet valve means mounted on said cylinder for providing an exhaust path from the interior of said cylinder as said cylinder moves to its lower position to permit such motion of the cylinder to proceed at a relatively rapid rate.

9. The fluid displacing unit defined in claim 8 in which said bracket means includes a pair of spaced upwardly extending guide rods for slidably supporting said cylinder.

10. The fluid displacing unit defined in claim 8 in which said inlet valve means comprises an intake needle valve mounted on and extending through said closed upper end of said cylinder, and in which said outlet valve means includes an exhaust flapper valve mounted on and extending through said closed upper end.

References Cited in the file of this patent

UNITED STATES PATENTS

| | | |
|---|---|---|
| 2,160,920 | Strawn | June 6, 1939 |
| 2,301,028 | Esch | Nov. 3, 1942 |
| 2,764,953 | Mullan | Oct. 2, 1956 |
| 2,771,047 | Zimmerman | Nov. 20, 1956 |
| 2,771,048 | Zimmerman | Nov. 20, 1956 |
| 2,771,050 | Zimmerman | Nov. 20, 1956 |
| 2,913,976 | Cole | Nov. 24, 1959 |
| 2,962,749 | Sasse | Dec. 6, 1960 |
| 2,993,272 | Carlzen et al. | July 25, 1961 |